(12) United States Patent
Kamiya et al.

(10) Patent No.: US 9,680,183 B2
(45) Date of Patent: Jun. 13, 2017

(54) LITHIUM SECONDARY BATTERY AND METHOD FOR PRODUCING SAME

(71) Applicant: TOYOTA JIDOSHA KABUSHIKI KAISHA, Toyota-shi, Aichi (JP)

(72) Inventors: Masato Kamiya, Anjo (JP); Taira Saito, Miyoshi (JP); Shin-ichi Tobishima, Maebashi (JP); Hideyuki Morimoto, Midori (JP); Masafumi Unno, Kiryu (JP)

(73) Assignee: TOYOTA JIDOSHA KABUSHIKI KAISHA, Toyota-shi, Aichi (JP)

(*) Notice: Subject to any disclaimer, the term of this patent is extended or adjusted under 35 U.S.C. 154(b) by 145 days.

(21) Appl. No.: 14/425,194

(22) PCT Filed: Aug. 12, 2013

(86) PCT No.: PCT/JP2013/071809
§ 371 (c)(1),
(2) Date: Mar. 2, 2015

(87) PCT Pub. No.: WO2014/038356
PCT Pub. Date: Mar. 13, 2014

(65) Prior Publication Data
US 2015/0221983 A1    Aug. 6, 2015

(30) Foreign Application Priority Data
Sep. 5, 2012 (JP) .................. 2012-195246

(51) Int. Cl.
*H01M 10/0567* (2010.01)
*H01M 10/052* (2010.01)
(Continued)

(52) U.S. Cl.
CPC ......... *H01M 10/0567* (2013.01); *H01M 4/13* (2013.01); *H01M 4/131* (2013.01);
(Continued)

(58) Field of Classification Search
None
See application file for complete search history.

(56) References Cited

U.S. PATENT DOCUMENTS

2010/0015514 A1* 1/2010 Miyagi ............... H01M 10/052
429/129
2012/0121982 A1  5/2012 Harimoto et al.

FOREIGN PATENT DOCUMENTS

CN    101894974 A    11/2010
JP    2004-71458 A    3/2004
(Continued)

OTHER PUBLICATIONS

Cai et al.. "Preparation and Reactivity of Polyfunctional six- and eight-membered cyclic silicates," 2004, Journal of Organometallic Chemistry, vol. 689, 689-693.*
(Continued)

*Primary Examiner* — Ula C Ruddock
*Assistant Examiner* — Matthew Van Oudenaren
(74) *Attorney, Agent, or Firm* — Sughrue Mion, PLLC

(57) ABSTRACT

This invention provides a lithium secondary battery comprising a positive electrode, a negative electrode, and a non-aqueous electrolyte. On the negative electrode surface, there is present a cyclic siloxane and/or a reaction product thereof. The cyclic siloxane is a cyclic siloxane having at least one side chain comprising a dimethylsiloxy group (a siloxy side chain-containing cyclic siloxane).

7 Claims, 3 Drawing Sheets

(51) Int. Cl.
*H01M 10/058* (2010.01)
*H01M 4/13* (2010.01)
*H01M 4/131* (2010.01)
*H01M 4/1391* (2010.01)
*H01M 4/505* (2010.01)
*H01M 4/525* (2010.01)
*H01M 10/0569* (2010.01)
*H01M 10/0587* (2010.01)

(52) U.S. Cl.
CPC ......... *H01M 4/1391* (2013.01); *H01M 4/505* (2013.01); *H01M 4/525* (2013.01); *H01M 10/052* (2013.01); *H01M 10/058* (2013.01); *H01M 10/0569* (2013.01); *H01M 10/0587* (2013.01); *H01M 2220/20* (2013.01); *H01M 2300/0017* (2013.01); *H01M 2300/0025* (2013.01); *H01M 2300/0028* (2013.01); *H01M 2300/0034* (2013.01); *H01M 2300/0037* (2013.01); *Y02E 60/122* (2013.01); *Y02P 70/54* (2015.11); *Y02T 10/7011* (2013.01); *Y10T 29/49108* (2015.01)

(56) References Cited

FOREIGN PATENT DOCUMENTS

| JP | 2006-66095 A | 3/2006 |
| JP | 2007-227368 A | 9/2007 |
| JP | 2009-163939 A | 7/2009 |
| KR | 10-2008-0056226 A | 6/2008 |
| KR | 10-2012-0051719 A | 5/2012 |

OTHER PUBLICATIONS

International Search Report for PCT/JP2013/071809 dated Oct. 8, 2013 [PCT/ISA/210].

* cited by examiner

LITHIUM SECONDARY BATTERY AND METHOD FOR PRODUCING SAME

CROSS REFERENCE TO RELATED APPLICATIONS

This application is a National Stage of International Application No. PCT/JP2013/071809, filed on Aug. 12, 2013, which claims priority from Japanese Patent Application No. 2012-195246, filed on Sep. 5, 2012, the contents of all of which are incorporated herein by reference in their entirety.

TECHNICAL FIELD

The present invention relates to a lithium secondary battery and a method for producing the same. The present application claims priority based on Japanese Patent Application No. 2012-195246 filed on Sep. 5, 2012, and the entire content thereof is incorporated herein by reference.

BACKGROUND ART

Being lightweight, yet capable of producing high energy densities, lithium secondary batteries are preferably used as so-called portable batteries for PCs and mobile devices, etc., and vehicle-installed batteries. In particular, great importance is placed on them as high-power batteries for driving vehicles such as electric automobiles, hybrid automobiles and the like. In such lithium secondary batteries, it has been suggested to add a cyclic siloxane to non-aqueous electrolyte solutions to increase their cycle characteristics, etc. Literatures disclosing this type of art include Patent Documents 1 to 4.

CITATION LIST

Patent Literature

[Patent Document 1] Japanese Patent Application Publication No. 2004-071458
[Patent Document 2] Japanese Patent Application Publication No. 2009-163939
[Patent Document 3] Japanese Patent Application Publication No. 2007-227368
[Patent Document 4] Japanese Patent Application Publication No. 2006-066095

SUMMARY OF INVENTION

Technical Problem

In a non-aqueous electrolyte secondary battery such as lithium secondary batteries, components (e.g. a supporting electrolyte, non-aqueous solvent) in the non-aqueous electrolyte solution may partially decompose during charging to form a layer (solid electrolyte interphase layer or "SEI layer" hereinafter) on the surface of the negative electrode active material. By storing the battery in a charged state or repeated charging and discharging, the formation of such SEI layer tends to further develop. When this causes excessive formation of SEI layer, the negative electrode resistance may increase, degrading the battery performance such as its capacity retention rate, etc. In the SEI layer, some of the lithium present in the battery may be trapped and fixed as lithium compounds such as LiF, $Li_2O$, etc. This could also be a factor to degrade the battery capacity of the lithium secondary battery caused by the excessive formation of SEI layer.

Patent Document 1 teaches that the use of an electrolyte solution comprising, as a cyclic siloxane, hexamethylcyclotrisiloxane, 1,3,5-trimethyl-1,3,5-trivinylcyclotrisiloxane or 1,3,5-trimethyl-1,3,5-triphenylcyclotrisiloxane has increased the initial output as well as the output after high-temperature charging and discharging cycles, as compared to a lithium secondary battery using an electrolyte solution free of such a cyclic siloxane. In Patent Document 2, an electrolyte solution having a composition including hexamethylcyclotrisiloxane or hexamethyldisiloxane (a linear siloxane) is used. According to the studies by the present inventors, however, with these cyclic or linear siloxanes, the effect of preventing degradation of battery capacity caused by repeated charging and discharging (e.g. the effect of increasing capacity retention rates) was not obtained, or the effect was insufficient.

The present invention has been made in view of such circumstances, with an objective thereof being to provide a lithium secondary battery having a greater ability to retain its capacity for repeated charging and discharging. Another objective is to provide a method for producing a lithium secondary battery having such a greater ability.

Solution to Problem

To achieve the objectives, the present invention provides a lithium secondary battery comprising a positive electrode, a negative electrode, and a non-aqueous electrolyte. On the surface of the negative electrode constituting the lithium secondary battery, there is present a cyclic siloxane and/or a reaction product thereof. The cyclic siloxane may be a siloxy side chain-containing cyclic siloxane, which has at least one side chain comprising a dimethylsiloxy group.

In a lithium secondary battery having such a constitution, in the presence of the siloxy side chain-containing cyclic siloxane and/or the reaction product thereof on the surface of the negative electrode, capacity degradation caused by repeated charging and discharging may be effectively prevented.

As the cyclic siloxane, can be preferably used a siloxy side chain-containing cyclic siloxane represented by the following formula (1):

[Chem 1]

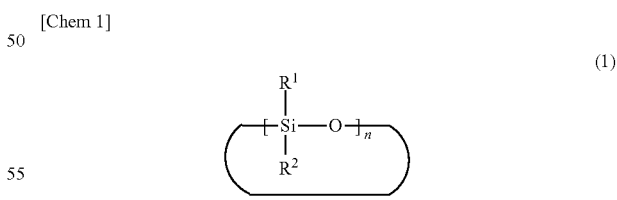

(In the formula (1), $R^1$ and $R^2$ are either the same or different with each being selected from among a hydrogen atom and organic groups having 1 to 12 carbon atoms, and at least either $R^1$ or $R^2$ includes a dimethylsiloxy group; and n is an integer between 3 and 10).

The lithium secondary battery disclosed herein may be constructed, for instance, with a non-aqueous electrolyte comprising the siloxy side chain-containing cyclic siloxane at 0.01 to 20% by mass. According to such a lithium secondary battery, the effect of the presence of the siloxy side chain-containing cyclic siloxane and/or the reaction product thereof on the negative electrode surface can be preferably exhibited.

The present invention also provides a method for producing a lithium secondary battery. The method comprises obtaining a positive electrode, obtaining a negative electrode, and supplying a cyclic siloxane at least to the negative electrode. Herein, the cyclic siloxane may be a siloxy side chain-containing cyclic siloxane having at least one side chain comprising a dimethylsiloxy group.

Such a lithium secondary battery obtained with a siloxy side chain-containing cyclic siloxane may exhibit a higher capacity retention rate when compared to a lithium secondary battery using a cyclic siloxane having only an alkyl side chain instead of the siloxy side chain-containing cyclic siloxane or to a lithium secondary battery using a linear siloxane instead of the siloxy side chain-containing cyclic siloxane.

As the siloxy side chain-containing cyclic siloxane, a compound represented by the formula (1) can be preferably used.

In a preferable embodiment of the production method disclosed herein, the supplying the cyclic siloxane comprises obtaining a non-aqueous electrolyte comprising the cyclic siloxane, and supplying the non-aqueous electrolyte obtained to the negative electrode. This allows supplying the cyclic siloxane in the non-aqueous electrolyte to the negative electrode so as to bring about a lithium secondary battery in which the siloxy side chain-containing cyclic siloxane and/or the reaction product thereof is suitably arranged on the negative electrode surface.

The production method disclosed herein can be preferably implemented in an embodiment using, as the non-aqueous electrolyte, a non-aqueous electrolyte comprising the siloxy side chain-containing cyclic siloxane at 0.01 to 20% by mass. By the use of such a non-aqueous electrolyte, the effect of the presence of the siloxy side chain-containing cyclic siloxane and/or the reaction product thereof on the negative electrode surface can be preferably exhibited.

The lithium secondary battery disclosed herein has a great ability to retain the battery capacity (capacity-retaining ability) for repeated charging and discharging. Thus, with the benefit of this feature, it can be preferably used as a power supply for driving a vehicle such as a hybrid vehicle (HV), plug-in hybrid vehicle (PHV), electric vehicle (EV) and the like. The present invention provides a vehicle equipped with a lithium secondary battery disclosed herein (which may be in a form of a battery system wherein several batteries are connected).

DESCRIPTION OF EMBODIMENTS

Figure 1:
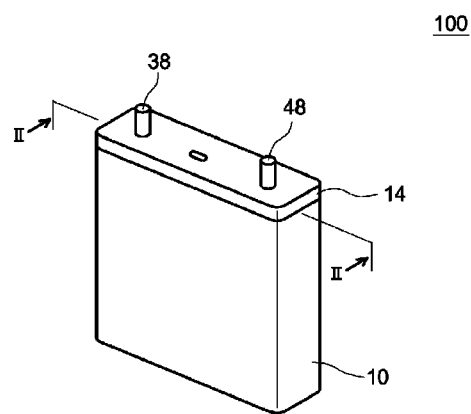
FIG. 1 shows a perspective view schematically illustrating the appearance of the lithium secondary battery according to an embodiment.

While referring to drawings, an embodiment of the present invention is described below. The dimensional relationships (of length, width, thickness, etc.) in each drawing do not represent actual dimensional relationships. Matters necessary to practice this invention other than those specifically referred to in this description may be understood as design matters based on the conventional art in the pertinent field to a person of ordinary skills in the art. The present invention can be practiced based on the contents disclosed in this description and common technical knowledge in the subject field. In the drawings referenced below, a common reference numeral may be assigned to members or sites producing the same effect, and duplicated descriptions may be omitted or simplified.

Preferable embodiments related to the lithium secondary battery are described below. In this description, the term "secondary battery" refers to a rechargeable battery in general and includes storage batteries (i.e. chemical batteries) such as lithium secondary batteries and the like as well as capacitors (i.e. physical batteries) such as electric double-layer capacitors and the like. The term "lithium secondary battery" in this description refers to a secondary battery that uses lithium ions (Li ions) as electrolytic ions and charges and discharges by means of transfer of charges associated with Li ions between the positive and negative electrodes. To that extent, the "lithium secondary battery" in this description may include, for instance, a secondary battery using, as charge carriers, other non-lithium metal ions (e.g. sodium ions) in combination. Batteries generally called lithium-ion secondary batteries are typical examples included in the lithium secondary battery in the present description.

Figure 2:
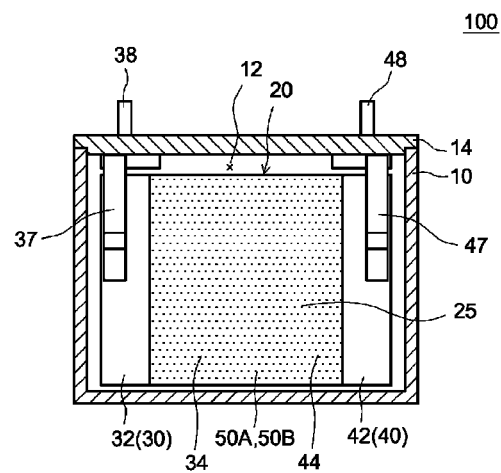
FIG. 2 shows a cross-sectional view taken along the line II-II in FIG. 1.

As shown in FIG. 1 and FIG. 2, a lithium secondary battery 100 comprises a square-shaped battery case 10 and a wound electrode body 20 housed in the battery case 10. Battery case 10 has an opening 12 on the top face. After wound electrode body 20 is placed via opening 12 into battery case 10, the opening 12 is sealed with a lid 14. Battery case 10 further houses a non-aqueous electrolyte (non-aqueous electrolyte solution) 25. Lid 14 is provided with an outer positive terminal 38 and an outer negative terminal 48. Terminals 38 and 48 partially protrude from the surface of lid 14. Part of outer positive terminal 38 is connected to an inner positive terminal 37 inside the battery case 10 while part of outer negative terminal 48 is connected to an inner negative terminal 47 inside the battery case 10.

Figure 3:
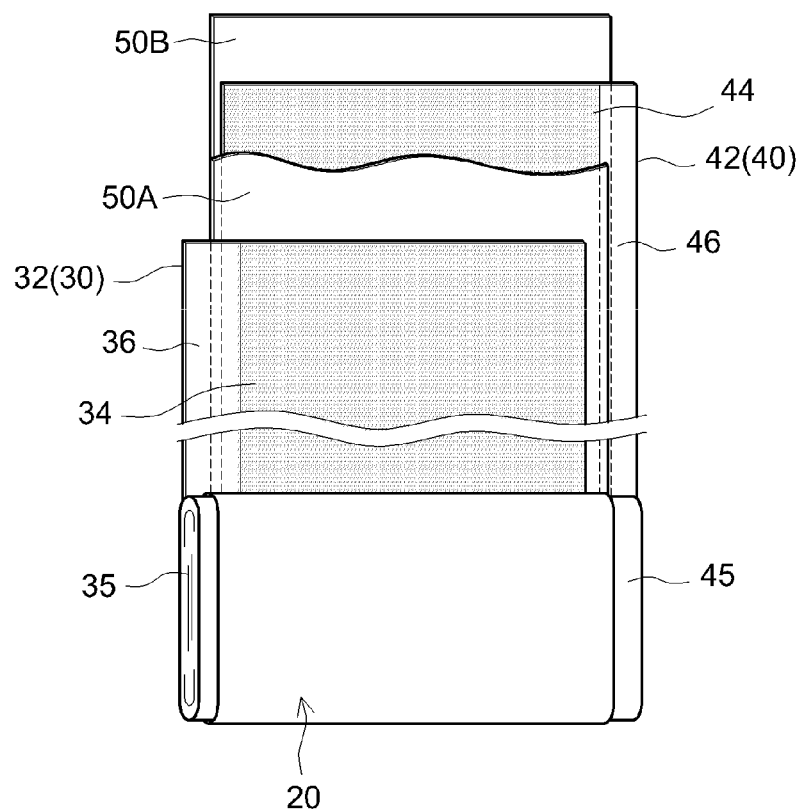
FIG. 3 shows a perspective view schematically illustrating the state of an electrode body according to an embodiment being prepared by means of winding.

As shown in FIG. 3, wound electrode body 20 comprises a long sheet of a positive electrode (positive electrode sheet) 30 and a long sheet of a negative electrode (negative electrode sheet) 40. Positive electrode sheet 30 comprises a length of a positive current collector 32 and a positive electrode active material layer 34 formed above at least one (typically each) face thereof. Negative electrode sheet 40 comprises a length of a negative current collector 42 and a negative electrode active material layer 44 formed above at least one (typically each) face thereof. Wound electrode body 20 further comprises two long sheets of separator (separator sheets) 50 A and 50B. Positive electrode sheet 30 and negative electrode sheet 40 are layered via two separator sheets 50A and 50B, in the order of positive electrode sheet 30, separator sheet 50A, negative electrode sheet 40 and separator sheet 50B. The layered body is wound in the length direction to form a wound body. The wound body is then laterally compressed and flattened to form a flat shape. The electrode body is not limited to a wound electrode body as described above. Depending on the shape, purpose, etc., of the battery, for instance, it may have a suitable shape and constitution such as a laminate form (layered form), etc.

On the wound electrode body 20, there is formed centrally widthwise (perpendicularly to the winding direction) a portion where the positive electrode active material layer 34 formed above the surface of positive current collector 32 and negative electrode active material layer 44 formed above the surface of negative current collector 42 are thickly laminated in layers. In positive electrode sheet 30, one edge across the width direction is provided with a portion where positive current collector 32 is exposed with no positive electrode active material layer 34 formed thereon (positive electrode active material layer-free portion 36). The positive electrode active material layer-free portion 36 extends beyond separator sheets 50A, 50B and negative electrode sheet 40. That is, in wound electrode body 20, on one edge across the width direction, there is formed a positive current collector-overlapping portion 35 where the positive electrode active material layer-free portion 36 of positive current collector 32 overlaps with itself. On the other edge across the width direction in wound electrode body 20, there is formed also a negative current collector-overlapping portion 45 where the negative electrode active material layer-free portion 46 of negative current collector 42 overlaps with itself. Separator sheets 50A and 50B have widths larger than the width of the laminated portion of positive electrode active material layer 34 and negative electrode active material layer 44, but smaller than the width of wound electrode body 20. These separators placed intermediately in the laminated portion of positive electrode active material layer 34 and negative electrode active material layer 44 prevent positive electrode active material layer 34 and negative electrode active material layer 44 from coming into contact with each other and causing internal short-circuit.

The respective components constituting the lithium secondary battery are described next.

As the positive current collector constituting the positive electrode (typically a positive electrode sheet) in the lithium secondary battery, a conductive material formed of a metal having good conductivity can be preferably used. As such a conductive material, for example, can be used aluminum or an alloy containing aluminum as the primary component. The shape of positive current collector is not particularly limited as it may vary depending on the shape, etc., of the battery, and may have a variety of shapes such as a rod, plate, sheet, foil, mesh, and so on. The thickness of positive current collector is not particularly limited, either, and can be, for instance, 5 μm to 30 μm. In addition to a positive electrode active material, the positive electrode active material layer may comprise, as necessary, one, two or more species of additive that are known to be usable in positive electrode active material layers in general lithium secondary batteries, such as a conductive material, binder, etc. . . .

As the positive electrode active material, can be used one, two or more species among various materials known to be usable as positive electrode active materials in lithium secondary batteries without particular limitations. For instance, can be used a layered or spinel lithium transition metal compound (typically an oxide) comprising lithium (Li) and at least one species of transition metal as metal constituents, a polyanion-type (e.g. olivine-type) lithium transition metal compound and the like. For the positive electrode active material, solely one species or a combination of two or more species can be used. More specifically, for instance, the following compounds can be used as the positive electrode active material.

(1) A lithium transition metal composite oxide represented by a general formula $Li_{1+\alpha}MO_2$ (A1), typically having a layered structure. Herein, M comprises at least one species of transition metal such as Ni, Co, Mn, etc., and may further comprise other metal(s) or non-metal(s). Specific examples of the compound represented by the general formula (A1) include $LiNiO_2$, $LiNi_{1/3}Co_{1/3}Mn_{1/3}O_2$, etc.

(2) A lithium transition metal oxide represented by a general formula $Li_{1+\alpha}Mn_{2-x}M_xO_4$ (B1), typically having a spinel structure. Herein, x meets $0 \leq x < 2$, or typically $0 \leq x \leq 1$. When x is greater than 0, M may be an arbitrary metal or non-metal excluding Mn. In a preferable compound, M comprises at least one species of transition metal. Specific examples of the compound represented by the general formula (B1) include $LiMn_2O_4$, $LiNi_{0.5}Mn_{1.5}O_4$, $LiCrMnO_4$, etc.

(3) A lithium transition metal oxide represented by a general formula $Li_{2+\alpha}MO_3$ (C1). Herein, M comprises at least one species of transition metal such as Mn, Fe, Co, etc., and may further comprise other metal(s) or non-metal(s). Specific examples of the compound represented by the general formula (C1) include $Li_2MnO_3$, $Li_2PtO_3$ and the like.

(4) A lithium transition metal compound (phosphate) represented by a general formula $Li_{1+\alpha}MPO_4$ (D1). Herein, M comprises at least one species of transition metal such as Mn, Fe, Ni, Co, etc., and may further comprise other metal(s) or non-metal(s). Specific examples of the compound represented by the general formula (D1) include $LiMnPO_4$, $LiFePO_4$ and the like.

(5) A lithium transition metal compound (phosphate) represented by a general formula $Li_{2+\alpha}MPO_4F$ (E1). Herein, M comprises at least one species of transition metal such as Mn, Ni, Co, etc., and may further comprise other metal(s) or non-metal(s). Specific examples of the compound represented by the general formula (E1) include $Li_2MnPO_4F$ and the like.

(6) A solid solution of $Li_{1+\alpha}MO_2$ and $Li_{2+\alpha}MO_3$. Herein, $Li_{1+\alpha}MO_2$ refers to a composition represented by the general formula (A1) in (1) above while $Li_{2+\alpha}MO_3$ refers to a composition represented by the general formula (C1) in (3) above. A specific example is a solid solution represented by $0.5LiNi_{1/3}Mn_{1/3}Co_{1/3}O_2$-$0.5Li_2MnO_3$.

In the respective compositional formulas in (1) to (6) above, α meets $0 \leq \alpha \leq 0.5$, or typically suitably $0 \leq \alpha \leq 0.3$ (e.g. $0 \leq \alpha \leq 0.2$).

The lithium secondary battery according to a preferable embodiment of the art disclosed herein comprises, as a positive electrode active material, a lithium transition metal oxide having a layered crystal structure (typically, a layered rock-salt structure belonging to the hexagonal system). For instance, a composition in which 90% by mass or more of the positive electrode active material layer is a lithium transition metal oxide having a layered crystal structure (a layered lithium transition metal oxide) can be preferably used. Essentially 100% by mass of the positive electrode active material may be a layered lithium transition metal oxide.

The layered lithium transition metal oxide preferably comprises at least one species of Ni, Co or Mn. Preferable examples include a lithium nickel oxide, a lithium cobalt oxide and a lithium manganese oxide. Herein, the lithium nickel oxide encompasses the oxide containing lithium (Li), nickel (Ni) and oxygen as constituents as well as an oxide comprising, besides lithium, nickel and oxygen, at least one species of element in an amount equal to or below the nickel content by the number of atoms. The metal besides Li and Ni may be, for instance, one, two or more species of element selected from Co, Mn, W, Cr, Mo, Ti, Zr, Nb, V, Al, Mg, Ca, Na, Fe, Cu, Zn, Si, Ga, In, Sn, La, Ce, B, F, etc. The same applies to the lithium cobalt oxide and lithium manganese oxide.

As the positive electrode active material in the lithium secondary battery disclosed herein, can be preferably used a positive electrode active material comprising a layered lithium transition metal oxide having a composition comprising at least Ni (a Ni-containing layered lithium transition metal oxide). For instance, with the total amount of metals other than lithium being 100 mol %, a preferable positive electrode active material comprises a layered lithium transition metal oxide containing 10 mol % or more (more preferably 20 mol % or more) Ni.

A preferable example of such a Ni-containing layered lithium transition metal oxide is a layered lithium transition metal oxide containing each of Ni, Co and Mn (or "LiNiCoMn oxide" hereinafter). For instance, based on the number of atoms, with the total amount of Ni, Co and Mn being 1, a LiNiCoMn oxide having each of Ni, Co and Mn above 0 up to 0.7 (more preferably above 0.1 up to 0.6, typically above 0.3 up to 0.5) is preferable. In particular, a LiNiCoMn oxide with Ni, Co and Mn in an approximately equimolar ratio (e.g. $LiNi_{1/3}Co_{1/3}Mn_{1/3}O_2$) is preferable.

The layered lithium transition metal oxide comprises at least one species of Ni, Co or Mn and may further comprise one, two or more other species of element as supplemental constituent element(s) (additive element(s)). Preferable examples of such additive elements include W, Cr, Mo, Ti, Zr, Nb, V, Al, Mg, Ca, Na, Fe, Cu, Zn, Si, Ga, In, Sn, La, Ce, B and F. For instance, a layered lithium transition metal oxide (e.g. a LiNiCoMn oxide) having a composition comprising, as the additive element, at least one species of metal selected from W, Cr and Mo can be preferably used. Such an additive element can be added in an amount of, for instance, about 0.001 to 5 mol % (typically about 0.005 to 1 mol %) with the total amount of other elements besides lithium and oxygen in the layered lithium transition metal oxide being 100 mol %. A particularly preferable composition comprises at least W as the additive element. A battery using a positive electrode active material comprising such a layered lithium transition metal oxide may have lower reaction resistance as well as excellent input and output characteristics. Alternatively, it may be a layered lithium transition metal oxide free of an aforementioned additive element.

The lithium secondary battery according to another preferable embodiment of the art disclosed herein comprises, as the positive electrode active material, a compound represented by the general formula (B1). For instance, a composition in which 90% by mass or more (e.g. essentially 100% by mass) of the positive electrode active material is a compound represented by the general formula (B1) can be preferably used.

Preferable examples of the compound represented by the general formula (B1) include a compound comprising at least Ni as M in the general formula (B1), such as a spinel lithium transition metal oxide represented by the next general formula (B2): $LiNi_pM^1_qMn_{2-p-q}O_4$ (or "LiNiMn composite oxide" hereinafter). Herein, $0<p$ and $0 \leq q$ while $p+q<2$ (typically $p+q \leq 1$). In a preferable embodiment, $q=0$ and $0.2 \leq p \leq 0.6$. The inclusion of Ni at such a ratio (ratio denoted by p in the general formula (B2)) can increase the positive electrode potential of a spinel LiNiMn composite oxide (e.g. $LiNi_{0.5}Mn_{1.5}O_4$) (typically to 4.5 V (vs. Li/Li$^+$) or higher) at charge completion, making it possible to construct a 5 V class lithium secondary battery. When $0<q$ in the general formula (B2), $M^1$ may be one, two or more species of arbitrary metal or non-metal excluding Ni and Mn (e.g. one, two or more species selected from Ti, Fe, Co, Cu, Cr, Zn and Al). $M^1$ preferably comprises at least either trivalent Fe or Co. It is also preferable to satisfy $0<q \leq 0.3$ and $1 \leq 2p+q$.

In an embodiment of the art disclosed herein, the lithium transition metal oxide used as the positive electrode active material may have a composition comprising excess Li by the number of atoms relative to the total amount $m_{Mall}$ of all other metals besides Li in the lithium transition metal oxide. In other words, the composition may satisfy $1.00<m_{Li}/m_{Mall}$. According to a lithium transition metal oxide having a composition comprising such excess Li relative to Mall, a lithium secondary battery of higher performance (e.g. greater output performance) can be obtained. In a preferable embodiment, $m_{Li}/m_{Mall}$ is 1.05 or higher, more preferably 1.10 or higher (i.e. $1.10 \leq m_{Li}/m_{Mall}$). The upper limit of $m_{Li}/m_{Mall}$ is not particularly limited. It is usually preferable that $m_{Li}/m_{Mall}$ is 1.4 or lower (preferably 1.3 or lower, e.g. 1.2 or lower).

The positive electrode active material is usually preferably in a form of particles having an average particle diameter of about 1 μm to 20 μm (e.g. 2 μm to 10 μm). Unless otherwise specified, the term "average particle diameter" in the present description refers to a particle diameter at 50% cumulative volume in a size distribution measured by a size distribution analyzer based on laser scattering/diffraction, that is, a 50% volume average particle diameter.

As the conductive material, a conductive powdery material such as carbon powder and carbon fiber are preferably used. Preferable examples of carbon powder include various kinds of carbon black, such as acetylene black, furnace black, Ketjen black, graphite powder and the like. Alternatively, among conductive fiber species such as carbon fiber, metal fiber, etc., and powdered metals such as copper, nickel, etc., and organic conductive materials such as polyphenylene derivatives, etc., and the like, solely one species or a mixture of two or more species can be used.

Examples of the binder include various polymer materials. For instance, when the positive electrode active material layer is formed with an aqueous composition (a composition wherein water or a mixed solvent primarily comprising water is used as the dispersion medium for active material particles), a water-soluble or water-dispersible polymer material can be preferably used as a binder. Examples of water-soluble or water-dispersible polymer materials include cellulose-based polymers such as carboxymethyl cellulose (CMC), etc.; polyvinyl alcohol (PVA); fluorine-based resins such as polytetrafluoroethylene (PTFE), etc.; vinyl acetate based polymers; rubbers such as styrene-butadiene rubber (SBR), acrylic acid-modified SBR resins (SBR-based latexes), etc.; and the like. Alternatively, when the positive electrode active material layer is formed with a solvent-based composition (a composition whose dispersion medium for active material particles primarily comprises an organic solvent), can be used polymer materials including vinyl halide resins such as polyvinylidene fluoride (PVDF), polyvinylidene chloride (PVDC), etc.; polyalkylene oxides such as polyethylene oxide (PEO), etc.; and the like. These binders can be used singly as one species or in combination of two or more species. The polymer materials exemplified above may be used also as thickeners or other additives in the positive electrode active material layer-forming composition, besides being used as the binder.

The positive electrode active material content in the positive electrode active material layer is higher than about 50% by mass, or preferably about 70% by mass to 97% by mass (e.g. 75% by mass to 95% by mass). The additive content in the positive electrode active material layer is not particularly limited. The conductive material content is preferably about 1 part by mass to 20 parts by mass (e.g. 2 parts by mass to 10 parts by mass, typically 3 parts by mass to 7 parts by mass) relative to 100 parts of positive electrode active material. The binder content is preferably about 0.8 part by mass to 10 parts by mass (e.g. 1 part by mass to 7 parts by mass, typically 2 parts by mass to 5 parts by mass) relative to 100 part by mass of positive electrode active material.

The method for fabricating a positive electrode as described above is not particularly limited and a conventional method can be suitably used. For instance, it can be fabricated by the following method. First, a positive electrode active material and, as necessary, a conductive material, binder, etc., are mixed with a suitable solvent (an aqueous solvent, non-aqueous solvent or a mixed solvent of these) to prepare a paste-like or slurry positive electrode active material layer-forming composition. The mixing can be carried out, for instance, using a suitable mixer (a planetary mixer, homodisper, clearmix, filmix, etc.). For the solvent used to prepare the composition, any of aqueous solvents and non-aqueous solvents can be used. The aqueous solvent may be a solvent showing aqueous properties as a whole, and water or a solvent mixture primarily comprising water can be preferably used. Preferable examples of non-aqueous solvents include N-methyl-2-pyrrolidone (NMP), methyl ethyl ketone, toluene, etc.

The composition thus prepared is applied to a positive current collector and then pressed as necessary after the solvent is allowed to evaporate off by drying. As a method for applying the composition to the positive current collector, can be suitably employed a technique similar to conventionally-known methods. For example, with a suitable applicator such as slit coater, die coater, gravure coater, comma coater, etc., the composition can be preferably applied to the positive current collector. The solvent can be dried off well by employing one or a combination of natural drying, heated air, low-humidity air, vacuum, infrared rays, far-infrared rays and electron beam. As a pressing method, can be employed a compression method such as a conventionally-known roll-pressing method or a flat-press method, etc. To adjust the thickness, the thickness can be measured with a thickness gauge and pressed several times to a desirable thickness by adjusting the press pressure. A positive electrode can be thus obtained having a positive electrode active material layer formed on the positive current collector.

The coating weight of positive electrode active material layer (non-volatile-based coating amount of positive electrode active material layer-forming composition) per unit surface area of positive current collector is not particularly limited. From the standpoint of obtaining sufficient conductive paths (conductive paths), it is preferably 3 mg/cm$^2$ or greater (e.g. 5 mg/cm$^2$ or greater, typically 6 mg/cm$^2$ or greater), but 45 mg/cm$^2$ or less (e.g. 28 mg/cm$^2$ or less, typically 15 mg/cm$^2$ or less) per face of positive current collector.

As the negative current collector constituting the negative electrode (typically a negative electrode sheet), can be preferably used a conductive member formed of a metal having a good conductivity. For example, can be used copper or an alloy comprising copper as the primary component. The shape of negative current collector is not particularly limited as it may vary in accordance with the shape of the battery, etc. It may be in various forms including shapes of a rod, plate, sheet, foil, mesh, and so on.

The thickness of negative current collector is not particularly limited, either. It can be, for instance, about 5 μm to 30 μm.

The negative electrode active material layer comprises a negative electrode active material capable of storing and releasing lithium ions serving as charge carriers. The composition or form of the negative electrode active material is not particularly limited. Among materials conventionally used in lithium secondary batteries, one, two or more species can be used. Examples of such negative electrode active materials include carbon materials generally used in lithium secondary batteries. Typical examples of such carbon materials include graphite carbons (graphite), amorphous carbons and the like. It is preferable to use a granular carbon material (carbon particles) containing a graphite structure (layered structure) at least partially. In particular, the use of a carbon material primarily comprising natural graphite is preferable. The natural graphite may be obtained by spheroidizing graphite flakes. Alternatively, a carbonaceous powder obtained by coating graphite surfaces with an amorphous carbon can be used. As other negative electrode active materials, oxides such as lithium titanate, etc.; silicon materials, tin materials and so on can be used singly, as an alloy, as a compound formed therefrom or as a composite material combining these materials. Lithium metal may be used as the negative electrode active material. The negative electrode active material content in the negative electrode active material layer is greater than about 50% by mass and preferably about 90% by mass to 99% by mass (e.g. 95% by mass to 99% by mass, typically 97% by mass to 99% by mass).

The negative electrode active material layer may comprise, besides the negative electrode active material, one, two or more species of binder, thickener and other additives that can be used in a negative electrode active material layer in a general lithium secondary battery. Binders include various polymer materials. For example, with respect to an aqueous composition or a solvent-based composition, those that can be contained in the positive electrode active material layer may be preferably used. Such binder may be used, not just as a binder, but also as a thickener or other additive in a negative electrode active material layer-forming composition. The additive content in the negative electrode active material layer is not particularly limited. It is preferably about 0.8% by mass to 10% by mass (e.g. about 1% by mass to 5% by mass, typically 1% by mass to 3% by mass).

The method for fabricating a negative electrode is not particularly limited and a conventional method can be employed. For instance, it can be fabricated by the following method. First, a negative electrode active material is mixed along with a binder, etc., in an aforementioned suitable solvent (an aqueous solvent, organic solvent or a mixed solvent of these) to prepare a paste-like or slurry negative electrode active material layer-forming composition. The composition thus prepared is applied to a negative current collector and then pressed as necessary after the solvent is allowed to evaporate off by drying. A negative electrode active material layer can be thus formed with the composition on the negative current collector to obtain a negative electrode comprising the negative electrode active material layer. As the methods for mixing, coating, drying and pressing, means similar to those for the positive electrode fabrication can be employed.

The coating weight of negative electrode active material layer (non-volatile-based coating amount of negative electrode active material layer-forming composition) per unit surface area of negative current collector is not particularly limited. From the standpoint of obtaining sufficient conductive paths (conducing paths), it is preferably 2 mg/cm² or greater (e.g. 3 mg/cm² or greater, typically 4 mg/cm² or greater), but 40 mg/cm² or less (e.g. 22 mg/cm² or less, typically 10 mg/cm² or less) per face of negative current collector.

In the lithium secondary battery disclosed herein, a prescribed cyclic siloxane and/or a reaction product thereof is present at least on the negative electrode surface (possibly on the surfaces of negative electrode active material particles). The cyclic siloxane is a siloxy side chain-containing cyclic siloxane having at least one side chain comprising a siloxy group (—OSi group). Herein, a cyclic siloxane "having at least one side chain comprising a siloxy group" refers to that at least one of the silicon atoms constituting the siloxane ring (or "ring-constituting Si atoms" hereinafter) has, as a substituent, a side chain (a siloxy side chain) having a structure comprising a siloxy group. The cyclic siloxane in the art disclosed herein typically has at least one siloxy side chain having a structure comprising a dimethylsiloxy group (—OSi(CH$_3$)$_2$H).

Such a cyclic siloxane (siloxy side chain-containing cyclic siloxane) has a steric structure comprising a ring structure and a siloxy side chain extending from the ring. A cyclic siloxane having such a steric structure and/or a reaction product thereof may act to effectively inhibit formation of SEI layer on a negative electrode surface through its steric effect. This may prevent degradation of battery performance caused by excessive formation of SEI layer, producing, for instance, an effect of bringing about greater battery capacity retention (a greater capacity retention rate) for repeated charging and discharging. It has been found by the present inventors that such a capacity retention rate increasing effect is not brought about by a cyclic siloxane having only an alkyl side chain (i.e. a cyclic siloxane free of a siloxy side chain). While the mechanism is unknown, it is presumed that a cyclic siloxane with a siloxy side chain plays an important role in increasing capacity retention rates.

As described above, the term "cyclic siloxane and/or a reaction product thereof" refers to a component (typically a precipitate) formed from the cyclic siloxane and can be thought to comprise at least either the cyclic siloxane or a reaction product thereof. The reaction product may be, for instance, a reductive decomposition product of the cyclic siloxane, a reaction product between the cyclic siloxane or a reductive decomposition product thereof and the non-aqueous solvent, etc. The presence of a precipitate derived from a cyclic siloxane can be detected, for instance, by collecting a sample from an electrode surface and applying a known analytical method such as ICP (inductively coupled plasma) emission spectroscopy, etc.

The cyclic siloxane is a compound having a ring (siloxane ring) formed of alternately connected Si and O atoms. The number of atoms (total number of Si and O atoms) constituting the siloxane ring is not particularly limited. In view of the film-forming ability, etc., it is usually suitably 4 to 20, or preferably 4 to 12 (e.g. 4 to 10, typically 6 or 8).

The number of siloxy side chains is not particularly limited as long as there is at least one. From the standpoint of obtaining a greater steric effect, it is preferably 2 or more, or more preferably 3 or more. The number of siloxy side chains can be at most twice the number of ring-constituting Si atoms. It is usually suitably at least 0.5 times and up to 1.5 times the number of ring-constituting Si atoms. For example, a preferable cyclic siloxane has a structure such that one siloxy side chain is coupled to every ring-constituting Si atom.

The siloxy side chain in the art disclosed herein may be an organic group comprising at least one siloxy group and having 1 to 12 (typically 2 to 12, e.g. 2 to 10) carbon atoms. For instance, the siloxy side chain may have a structure such that a siloxy group is coupled with a saturated or unsaturated hydrocarbon group, saturated or unsaturated fluorinated hydrocarbon group, hydrogen atom, halogen atom, etc. Examples of the hydrocarbon group include an alkyl group, alkenyl group, vinyl group, allyl group, aryl group (e.g. phenyl group), alkylaryl group, etc. The fluorinated hydrocarbon group may have a structure such that the hydrogen atoms in the saturated or unsaturated hydrocarbon group are partially or entirely substituted with fluorine atoms. For instance, it may be a fluorinated alkyl group such as monofluoromethyl group, difluoromethyl group, perfluoromethyl group, etc.

While the number of siloxy groups contained in one siloxy side chain may be two or more (e.g. about two to five), it is usually preferably one.

The siloxy group included in the siloxy side chain may be coupled to a ring-constituting Si atom via a different structural moiety (e.g. an alkylene group such as methylene group, etc.; an oxyalkylene group such as oxyethylene group, etc.; and the like), or the siloxy group (—OSi group) may be directly connected to the ring-constituting Si atom. From the standpoint of obtaining a greater steric effect, a preferable cyclic siloxane has at least one siloxy side chain whose siloxy group is directly connected to a ring-constituting Si atom.

An alkylsiloxy group is a preferable example of the siloxy side chain having a structure where its siloxy group is directly connected to a ring-constituting Si atom. For example, an alkylsiloxy group represented by the next formula —OSiR$^{31}$R$^{32}$R$^{33}$ is preferable. Herein, R$^{31}$ is an alkyl group, preferably an alkyl group having 1 to 12 (more preferably 1 to 6, e.g. 1 to 3) carbon atoms. R$^{32}$ and R$^{33}$ are each independently selected from a hydrogen atom and alkyl groups. The number of carbon atoms in the alkyl group is preferably 1 to 12, more preferably 1 to 6, for instance, 1 to 3. In the art disclosed herein, the siloxy side chain may be a dialkylsiloxy group with R$^{32}$ being an alkyl group and R$^{33}$ being a hydrogen atom, a trialkylsiloxy group with each of R$^{32}$ and R$^{33}$ being an alkyl group, or a monoalkylsiloxy group with each of R$^{32}$ and R$^{33}$ being a hydrogen atom. From the standpoint of the steric effect, etc., a dialkylsiloxy group or a trialkylsiloxy group is preferable. From the standpoint of the film-forming ability, a dialkylsiloxy group is particularly preferable.

Preferable examples of a dialkylsiloxy group include a dialkylsiloxy group represented by the next formula —OSiR$^{41}$R$^{42}$H. R$^{41}$ and R$^{42}$ may be each independently an alkyl group having 1 to 12 (preferably 1 to 6, more preferably 1 to 3) carbon atoms. Specific examples include dimethylsiloxy group, diethylsiloxy group, di-(n-propyl)siloxy group, di-(isopropyl)siloxy group, dibutylsiloxy group, dipentylsiloxy group, diheptiylsiloxy group, dicyclohexylsiloxy group, methylethylsiloxy group, methylpropylsiloxy group, methylbutylsiloxy group, ethylpropylsiloxy group, ethylbutylsiloxy group, propylbutylsiloxy group, etc. Usually, a dialkylsiloxy group whose R$^{41}$ and R$^{42}$ are the same group is preferable.

Preferable examples of the cyclic siloxane disclosed herein include a siloxy side chain-containing cyclic siloxane (a dimethylsiloxy side chain-containing cyclic siloxane) represented by the formula (1):

[Chem 2]

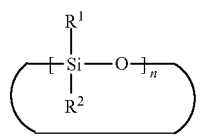
(1)

Herein, $R^1$ and $R^2$ are either the same or different with each being selected from among a hydrogen atom and organic groups having 1 to 12 carbon atoms, and at least either $R^1$ or $R^2$ includes a dimethylsiloxy group; and n is an integer between 3 and 10

In the formula (1), between $R^1$ and $R^2$, the non-dimethylsiloxy group can be selected from among a hydrogen atom and organic groups having 1 to 12 carbon atoms. Examples of the organic groups include linear alkyl groups such as methyl, ethyl, n-propyl, isopropyl, n-butyl, isobutyl, sec-butyl, t-butyl, n-pentyl, 1-methylbutyl, 2-methylbutyl, 3-methylbutyl, 1-methyl-2-methylpropyl, 2,2-dimethylpropyl, hexyl, heptyl, octyl, nonyl, decyl, etc.; cyclic alkyl groups such as cyclohexyl, norbornanyl, etc.; alkenyl groups such as vinyl, 1-propenyl, allyl, butenyl, 1,3-butadienyl, etc.; alkynyl groups such as ethynyl, propynyl, butynyl, etc.; halogenated alkyl groups such as trifluoropropyl, etc.; saturated heterocyclic group-containing alkyl groups such as 3-pyrrolizinopropyl, etc.; aryl groups such as a phenyl group which may have an alkyl group, etc.; aralkyl groups such as phenylmethyl, phenylethyl, etc.; trialkylsilyl groups such as trimethylsilyl, etc.; trialkylsiloxy groups such as trimethylsiloxy, etc.; and the like.

From the standpoint of preferably bringing about the effect of the siloxy side chain-containing cyclic siloxane, the non-dimethylsiloxy group is preferably a hydrogen atom or an organic group having 1 to 10 (e.g. 1 to 6) carbon atoms. Preferable examples include a hydrogen atom, alkyl group having 1 to 10 carbon atoms, alkenyl group having 2 to 4 carbon atoms, aryl group having 6 to 8 carbon atoms, and the like. From the standpoint of facilitating its supply to the negative electrode, etc., for instance, it is preferably a hydrogen atom or an alkyl group having 1 to 4 carbon atoms (methyl group, ethyl group, isobutyl group, etc.).

In the formula (1), at least either $R^1$ or $R^2$ comprises a dimethylsiloxy group. Preferably, at least either $R^1$ or $R^2$ (typically solely $R^1$ or $R^2$) is entirely a dimethylsiloxy group.

In the formula (1), n is an integer between 3 and 10. From the standpoint of the effect of increasing the capacity retention rate, n is preferably an integer between 3 and 6, more preferably an integer between 3 and 5, or particularly preferably 3 or 4 (e.g. 4).

Specific examples of the dimethylsiloxy side chain-containing cyclic siloxane include dimethylsiloxy side chain-containing cyclotrisiloxane, dimethylsiloxy side chain-containing cyclotetrasiloxane, dimethylsiloxy side chain-containing cyclopentasiloxane, dimethylsiloxy side chain-containing cyclohexasiloxane, dimethylsiloxy side chain-containing cycloheptasiloxane, dimethylsiloxy side chain-containing cyclooctasiloxane, dimethylsiloxy side chain-containing cyclononasiloxane and dimethylsiloxy side chain-containing cyclodecasiloxane. In particular, from the standpoint of increasing the capacity retention rate, dimethylsiloxy side chain-containing cyclotrisiloxane, dimethylsiloxy side chain-containing cyclotetrasiloxane, dimethylsiloxy side chain-containing cyclopentasiloxane and dimethylsiloxy side chain-containing cyclohexasiloxane are preferable, with dimethylsiloxy side chain-containing cyclotetrasiloxane being particularly preferable.

From the standpoint of facile synthesis or the availability of the compound, etc., a cyclic siloxane with at least either $R^1$ or $R^2$ in the formula (1) being a single species is advantageous. Specific examples of such a cyclic siloxane include a cyclic siloxane with $R^1$ being a single species of alkyl group and $R^2$ being a single species of siloxy group, such as 2,4,6,8-tetraisobutyl-2,4,6,8-tetra(dimethylsiloxy)cyclotetrasiloxane, etc.; a cyclic siloxane with $R^2$ being a single species of siloxy group and $R^1$ including two species of alkyl group, approximately half and half, such as 2,4-dimethyl-6,8-diethyl-2,4,6,8-tetra(dimethylsiloxy)cyclotetrasiloxane, etc.; a cyclic siloxane with $R^1$ being a single species of alkyl group and at least one $R^2$ being a siloxy group, such as 2,4,6,8-tetraisobutyl-2-methyl-4,6,8-tri(dimethylsiloxy)cyclotetrasiloxane, etc.; and the like. A cyclic siloxane with each of $R^1$ and $R^2$ being a single species can be preferably used.

The separator (separator sheet) placed so as to separate the positive electrode and negative electrode may be formed of a material that insulates the positive electrode active material layer and negative electrode active material layer while allowing transport of the electrolyte. A preferable example of separator is constituted with a porous polyolefin-based resin. For instance, can be preferably used an about 5 μm to 30 μm thick porous separator sheet made of a synthetic resin (e.g. a polyethylene, polypropylene, polyolefin having a structure including two or more layers of these in combination). The separator sheet may be provided with a heat-resistant layer. Alternatively, when, instead of a liquid-form electrolyte, a solid-form (gel-form) electrolyte comprising the aforementioned electrolyte and a polymer added thereto is used, the electrolyte itself may serve as a separator, necessitating no separator.

The non-aqueous electrolyte (typically an electrolyte in a liquid form at room temperature around 25° C., e.g. an electrolyte solution) injected into the lithium secondary battery may comprise at least a non-aqueous solvent and a supporting salt. A typical example is an electrolyte solution having a composition comprising a supporting salt in a suitable non-aqueous solvent. As the non-aqueous solvent, similarly to electrolyte solutions in general lithium secondary batteries, various carbonates, ethers, esters, nitriles, sulfones, lactones and the like can be used. The carbonates include cyclic carbonates and linear carbonates. The ethers include cyclic ethers and linear ethers. Specific examples of compounds that can be used as the non-aqueous solvent include ethylene carbonate (EC), propylene carbonate (PC), diethyl carbonate (DEC), dimethyl carbonate (DMC), ethyl methyl carbonate (EMC), vinylene carbonate (VC), 1,2-dimethoxyethane, 1,2-diethoxyethane, tetrahydrofuran, 2-methyltetrahydrofuran, dioxane, 1,3-dioxolane, diethylene glycol dimethyl ether, ethylene glycol dimethyl ether, acetonitrile, propionitrile, nitromethane, N,N-dimethylformamide, dimethylsulfoxide, sulfolane, γ-butyrolactone, fluorination products of these, etc. These can be used solely as one species or in combination of two or more species.

Preferable examples of the non-aqueous solvent in the art disclosed herein include a non-aqueous solvent primarily comprising a carbonate. For instance, it is possible to preferably use a non-aqueous electrolyte solution comprising, as the non-aqueous solvent, one, two or more species of carbonate, with the total carbonate mass accounting for 60% by mass or more (more preferably 75% by mass or more, yet more preferably 90% by mass or more, or even essentially 100% by mass) of the total mass of the non-aqueous solvent.

Preferable specific examples include a solvent mixture of EC and EMC, a solvent mixture of EC, DMC and EMC, and the like.

Other preferable examples of the non-aqueous solvent in the art disclosed herein include one, two or more species of fluorinated carbonate (e.g. a fluoride of an aforementioned carbonate). Either a fluorinated cyclic carbonate or fluorinated acyclic carbonate can be preferably used. Usually, it is preferable to use a fluorinated carbonate having one carbonate moiety per molecule. The F-substitution ratio in such a fluorinated carbonate is usually suitable to be 10% or greater, or for instance, it can be 20% or greater (typically 20% or greater, but smaller than 100%, e.g., 20% or greater, but 80% or smaller).

As the supporting salt, for example, can be used one, two or more species of lithium compounds (lithium salts) such as $LiPF_6$, $LiBF_4$, $LiClO_4$, $LiAsF_6$, $LiCF_3SO_3$, $LiC_4F_9SO_3$, $LiN(CF_3SO_2)_2$, $LiC(CF_3SO_2)_3$, LiI and the like. The supporting salt concentration is not particularly limited while it can be about 0.1 mol/L to 5 mol/L (e.g. 0.5 mol/L to 3 mol/L, typically 0.8 mol/L to 1.5 mol/L).

The non-aqueous electrolyte may comprise optional additives as necessary to an extent not significantly impairing the objectives of the present invention. The additive may be used for one, two or more purposes, such as to increase the battery's output performance, to increase the shelf life (to inhibit a capacity decrease during storage, etc.), to bring about greater cycle characteristics, to increase the initial charging and discharging efficiencies, and so on. Examples of preferable additives include a fluorophosphate (preferably a difluorophosphate, e.g. lithium difluorophosphate represented by $LiPO_2F_2$) and lithium bis(oxalato)borate (LiBOB). Alternatively, for instance, can be used additives such as cyclohexylbenzene, biphenyl and the like which are applicable in dealing with overcharges.

A production method for a lithium secondary battery is described next. The secondary battery production method comprises obtaining a positive electrode and a negative electrode, and supplying a cyclic siloxane at least to the negative electrode. Besides these steps, the production method may further comprise other steps such as fabricating the positive electrode, fabricating the negative electrode, constructing a lithium secondary battery with the positive electrode and the negative electrode, and so on. However, since these can be carried out by suitably employing specifications described above and methods that have been conventionally used, they are not described in particular.

The production method disclosed herein comprises supplying a siloxy side chain-containing cyclic siloxane at least to the negative electrode. At least some of the siloxy side chain-containing cyclic siloxane supplied to the negative electrode is present on the negative electrode surface (e.g. absorbed, accumulated, precipitated, etc., on the negative electrode) as the siloxy side chain-containing cyclic siloxane and/or a reaction product thereof, whereby it may act to inhibit the formation of SEI layer on the negative electrode surface. As the siloxy side chain-containing cyclic siloxane, those listed earlier can be preferably used. As long as the siloxy side chain-containing cyclic siloxane is supplied at least to the negative electrode, it may be supplied to other battery components besides the negative electrode, such as the positive electrode, etc.

In the production method according to a preferable embodiment, the siloxy side chain-containing cyclic siloxane is supplied to the negative electrode through a non-aqueous electrolyte. For example, a lithium secondary battery can be constructed by obtaining (preparing) a non-aqueous electrolyte comprising the siloxy side chain-containing cyclic siloxane and placing the non-aqueous electrolyte so as to make contact with the positive electrode and negative electrode. According to this supply method, the siloxy side chain-containing cyclic siloxane can be accurately supplied to the respective portions of the negative electrode surface.

When using a non-aqueous electrolyte comprising a siloxy side chain-containing cyclic siloxane, the siloxy side chain-containing cyclic siloxane content (% by mass) in the non-aqueous electrolyte is not particularly limited. From the standpoint of obtaining a sufficient capacity retention rate-increasing effect, it is usually preferably 0.005% by mass or higher (e.g. 0.01% by mass or higher, typically 0.05% by mass or higher). From the standpoint of inhibiting degradation of battery properties (e.g. an increase in resistance) caused by an excessive addition thereof, the siloxane content is preferably below 25% by mass (more preferably 20% by mass or less, e.g. 15% by mass or less). When the siloxy side chain-containing cyclic siloxane content is too excessive, disadvantages of the excessive addition outscore the capacity retention rate-increasing effect, whereby a desirable effect tends not to be obtained. In view of the balance between the capacity retention rate-increasing effect and raw material cost, the siloxy side chain-containing cyclic siloxane content in the non-aqueous electrolyte can be, for instance, 10% by mass or lower, 5% by mass or lower, or even 1% by mass or lower.

The method for supplying the siloxy side chain-containing cyclic siloxane to the negative electrode is not limited to the inclusion in a non-aqueous electrolyte as described above. For instance, there can be cited a method where a dispersion or solution of the siloxy side chain-containing cyclic siloxane in a suitable liquid medium (typically water or an organic solvent) is applied to the negative electrode surface and allowed to dry as necessary. Alternatively, the siloxy side chain-containing cyclic siloxane may be included in the negative electrode active material layer-forming composition.

Figure 5:
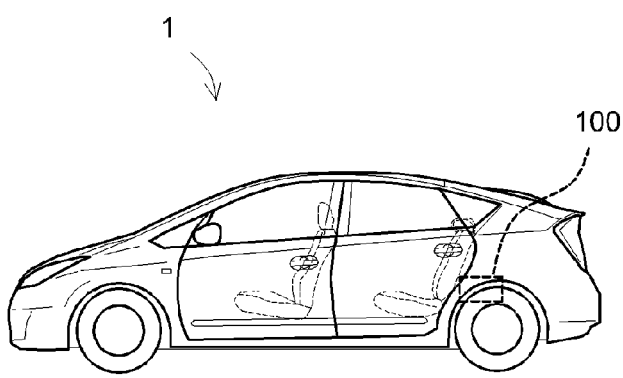
FIG. 5 shows a side view schematically illustrating a vehicle (automobile) comprising the lithium secondary battery according to an embodiment.

As described above, having an increased capacity retention rate, the lithium secondary battery in the art disclosed herein can be used as a secondary battery for various purposes. For example, as shown in FIG. 5, a lithium secondary battery 100 can be installed in a vehicle 1 such as an automobile, etc., and preferably used as a power supply for a drive source such as a motor and the like to drive the vehicle 1. Accordingly, the present invention can provide a vehicle (typically an automobile, particularly an automobile comprising an electric motor such as a hybrid vehicle (HV), plug-in hybrid vehicle (PHV), electric vehicle (EV) and fuel cell vehicle) 1 comprising, as its power source, the lithium secondary battery (typically a multi-cell battery comprising several series-connected cells) 100.

Several worked examples relating to the present invention are described below, but the present invention is not intended to be limited to these examples.

In the experiments below, the following siloxane compounds were used.

[Siloxy Side Chain-Containing Cyclic Siloxanes]

Compound (a1): Cyclic siloxane with each of $R^{11}$, $R^{12}$, $R^{13}$ and $R^{14}$ in the formula (2) below being an isobutyl group (—$CH_2CH(CH_3)_2$) (2,4,6,8-tetraisobutyl-2,4,6,8-tetra(dimethylsiloxy)cyclotetrasiloxane)

Compound (a2): Cyclic siloxane with each of $R^{11}$, $R^{12}$, $R^{13}$ and $R^{14}$ in the formula (2) below being a methyl group (—CH)

Compound (a3): Cyclic siloxane with each of $R^{11}$, $R^{12}$, $R^{13}$ and $R^{14}$ in the formula (2) below being an ethyl group (—$CH_2CH_3$)

Compound (a4): Cyclic siloxane with each of $R^{11}$, $R^{12}$, $R^{13}$ and $R^{14}$ in the formula (2) below being a n-nonyl group (—$(CH_2)_8CH_3$)

Compound (a5): Cyclic siloxane with each of $R^{11}$, $R^{12}$, $R^{13}$ and $R^{14}$ in the formula (2) below being an allyl group (—$CH_2CH=CH_2$)

Compound (a6): Cyclic siloxane with each of $R^{11}$, $R^{12}$, $R^{13}$ and $R^{14}$ in the formula (2) below being a phenyl group (—$C_6H_5$)

Compound (a7): Cyclic siloxane with each of $R^{11}$, $R^{12}$, $R^{13}$ and $R^{14}$ in the formula (2) below being a vinyl group (—$CH=CH_2$)

Compound (a8): Cyclic siloxane with each of $R^{11}$, $R^{12}$, $R^{13}$ and $R^{14}$ in the formula (2) below being a hydrogen atom (H)

Compound (a9): Cyclic siloxane with two among $R^{11}$, $R^{12}$, $R^{13}$ and $R^{14}$ in the formula (2) below being each a methyl group and the other two being each an ethyl group

[Chem 3]

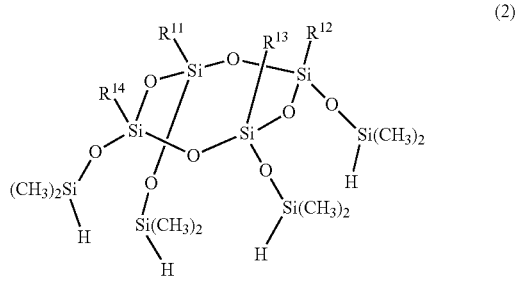

(2)

[Siloxy Group-Free Cyclic Siloxane]
Compound (b1): hexamethylcyclotrisiloxane
[Linear Siloxane]
Compound (c1): hexamethyldisiloxane Example 1

Fabrication of Coin Cell

Stainless steel pieces as working electrodes and lithium metal pieces as counter electrodes were placed along with separators and non-aqueous electrolyte solutions in stainless steel containers to construct 2032 coin cells A1 to A7 (half cells for performance tests) of 20 mm diameter and 3.2 mm thickness, respectively. As the separators, porous polyolefin sheets were used. The non-aqueous electrolyte solutions used were prepared as follows: an electrolyte solution was obtained, having a base composition containing approximately 1 mol/L of $LiPF_6$ as a supporting salt in a 3:7 (by mass) solvent mixture of ethylene carbonate (EC) and ethyl methyl carbonate (EMC). To this, Compound (a1) as a siloxane compound was added to the Compound (a1) content values (% by mass) shown in Table 1, respectively. For instance, in constructing Cell A3, an electrolyte solution prepared by mixing the electrolyte solution having the base composition and Compound (a1) at a mass ratio of 85:15 (an electrolyte solution containing Compound (a1) at 15% by mass) was used. In constructing Cell A5, the electrolyte solution of the base composition was used as it was.
[Post 50 Cycles Capacity Retention Rate Test]

Figure 4:
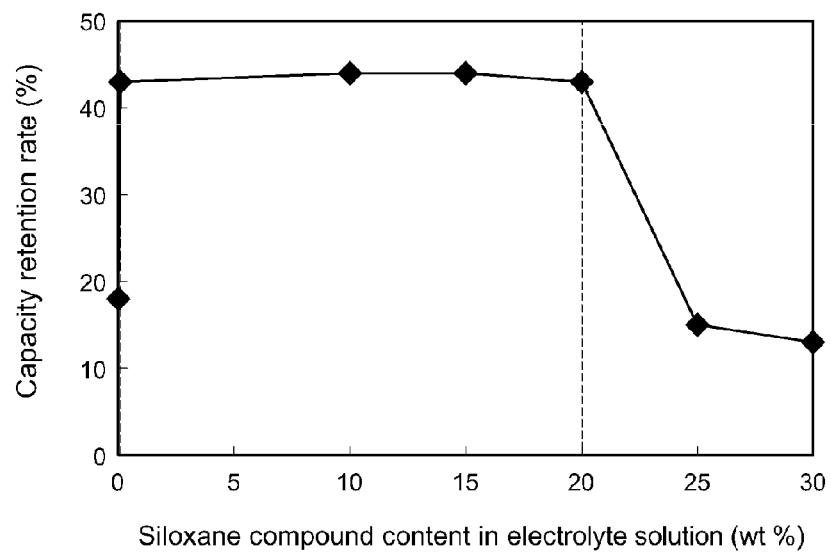
FIG. 4 shows a graph indicating the relationship between the cyclic siloxane content in non-aqueous electrolyte and capacity retention rate.

At a temperature of 60° C., each of Cells A1 to A7 was subjected to 50 cycles of charging and discharging at a current density of 0.5 mA/cm² with a cut-off voltage ranging from −2.0 V to 1.5 V (E/V vs. (Li/Li⁺)). With the charge capacity of the first cycle (capacity to charge the stainless steel with lithium ions as lithium metal) being 100%, the retention rate (%) of charge capacity at 50th cycle was determined. The results are shown in Table 1 and FIG. 4.

TABLE 1

| Cell | Siloxane compound | | Capacity retention rate (%) |
|---|---|---|---|
| | Species | Content (wt %) | |
| A1 | a1 | 0.1 | 43 |
| A2 | a1 | 10 | 44 |
| A3 | a1 | 15 | 44 |
| A4 | a1 | 20 | 43 |
| A5 | — | — | 18 |
| A6 | a1 | 25 | 15 |
| A7 | a1 | 30 | 13 |

<Experiment 2>

The electrolyte solution of the base composition was mixed with Compounds (a2) to (a9), respectively, at a mass ratio of 85:15 to prepare electrolyte solutions (i.e. electrolyte solutions comprising the respective siloxane compounds at 15% by mass). Using these electrolyte solutions, coin cells B1 to B8 were constructed in the same manner as Example 1. In addition, using electrolyte solutions prepared by mixing the electrolyte solution of the base composition with Compound (b1) and (c1), respectively, at a mass ratio of 85:15, coin cell B9 and B10 were constructed in the same manner as Example 1.

Cells B1 to B10 were subjected to the same test as the post 50 cycles capacity retention rate. The results are shown in Table 2. Table 2 also shows the results of capacity retention rate tests of Cells A3 and A5 obtained in Example 1.

TABLE 2

| Cell | Siloxane compound Species | Capacity retention rate (%) |
|---|---|---|
| A3 | a1 | 44 |
| B1 | a2 | 45 |
| B2 | a3 | 46 |
| B3 | a4 | 44 |
| B4 | a5 | 46 |
| B5 | a6 | 47 |
| B6 | a7 | 46 |
| B7 | a8 | 45 |
| B8 | a9 | 45 |
| A5 | — | 18 |
| B9 | b1 | 18 |
| B10 | c1 | 17 |

As shown in Table 1 and Table 2, as compared to the capacity retention rate of Cell A5 using the base electrolyte solution (free of a siloxy side chain-containing cyclic siloxane), the post 50 cycles capacity retention rates increased twofold or greater in Cells A1 to A4 and B1 to B8 using electrolyte solutions containing Compounds (a1) to (a9) all being siloxy side chain-containing cyclic siloxanes. These results indicate that the use of an electrolyte solution comprising a siloxy side chain-containing cyclic siloxane (herein, a cyclotetrasiloxane having four dimethylsiloxy side chains) can greatly increase the capacity retention rate of a lithium secondary battery. This effect is presumed to be obtained as follows: the SEI layer formation is inhibited on negative electrode (herein, on the lithium metal electrode as the counter electrode) by the use of a siloxy side chain-containing cyclic siloxane, thereby keeping the resistance of negative electrode relative to intercalation of lithium ions at a low level or reducing the amount of lithium ions trapped and fixed in the SEI layer. Accordingly, the capacity retention rate-increasing effect obtained in these cells by the siloxy side chain-containing cyclic siloxanes is thought to be also exhibited similarly, for instance, in a lithium secondary battery having a general constitution (e.g. a lithium secondary battery that comprises a positive electrode comprising as a positive electrode active material a lithium transition metal oxide such as a LiNiCoMn oxide, etc., and a negative electrode comprising a carbon material as a negative electrode active material).

With respect to the coin cell constitutions according to the present examples, when at least the Compound (a1) content was in a range of 20% by mass or below, the aforementioned effect to greatly increase capacity retention rates was observed. Even with 0.1% Compound (a1) content by mass, a sufficient capacity retention rate-increasing effect was produced. The capacity retention rate-increasing effect was obtained whether $R^{11}$ to $R^{14}$ were hydrocarbon groups having 1 to 10 carbon atoms (e.g. alkyl groups, alkenyl groups, aryl groups) or hydrogen atoms.

On the contrary, with respect to Cell B9 using Compound (b1) which was a siloxy side chain-free cyclic siloxane, there was observed no effect to increase the capacity retention rate relative to Cell A5. With respect to Cell B10 using Compound (c1) which was a linear siloxane, there was observed no effect to increase the capacity retention rate relative to Cell A5, or if anything, there was a tendency toward a lower capacity retention rate. These results support that the steric effect of a siloxy side chain-containing cyclic siloxane plays an important role in increasing capacity retention rates.

Although specific embodiments of the present invention have been described in detail above, these are merely for illustrations and do not limit the scope of the claims. The invention disclosed herein includes various modifications and changes made to the specific embodiments illustrated above.

REFERENCE SIGNS LIST 1 automobile (vehicle)
10 battery case
12 opening
14 lid
20 wound electrode body
25 non-aqueous electrolyte (non-aqueous electrolyte solution)
30 positive electrode (positive electrode sheet)
32 positive current collector
34 positive electrode active material layer
35 positive current collector-overlapping portion
36 positive electrode active material layer-free portion
37 inner positive terminal
38 outer positive terminal
40 negative electrode (negative electrode sheet)
42 negative current collector
44 negative electrode active material layer
45 negative current collector-overlapping portion
46 negative electrode active material layer-free portion
47 inner negative terminal
48 outer negative terminal
50A, 50B separators (separator sheets)
100 lithium secondary battery

The invention claimed is:

1. A lithium secondary battery comprising a positive electrode, a negative electrode, and a non-aqueous electrolyte, wherein
a cyclic siloxane and/or a reaction product thereof is present on the surface of the negative electrode, and
the cyclic siloxane is a siloxy side chain-containing cyclic siloxane having at least one side chain comprising a dimethylsiloxy group.

2. The lithium secondary battery according to claim 1, wherein the cyclic siloxane is a siloxy side chain-containing cyclic siloxane represented by a formula (1):

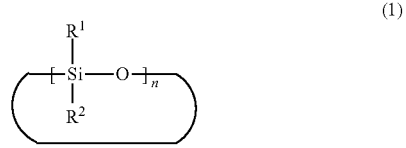

(in the formula (1), $R^1$ and $R^2$ are either the same or different with each being selected from among a hydrogen atom and organic groups having 1 to 12 carbon atoms, and at least either $R^1$ or $R^2$ includes a dimethylsiloxy group; and n is an integer between 3 and 10).

3. A method for producing a lithium secondary battery, the method comprising:
obtaining a positive electrode and a negative electrode, and
supplying a cyclic siloxane at least to the negative electrode, wherein the cyclic siloxane is a siloxy side chain-containing cyclic siloxane having at least one side chain comprising a dimethylsiloxy group.

4. The lithium secondary battery production method according to claim 3, using, as the cyclic siloxane, a siloxy side chain-containing cyclic siloxane represented by a formula (1):

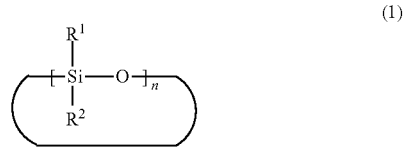

(in the formula (1), $R^1$ and $R^2$ are either the same or different with each being selected from among a hydrogen atom and organic groups having 1 to 12 carbon atoms, and at least either $R^1$ or $R^2$ includes a dimethylsiloxy group; and n is an integer between 3 and 10).

5. The lithium secondary battery production method according to claim 3, wherein
the supplying the cyclic siloxane comprises
obtaining a non-aqueous electrolyte comprising the cyclic siloxane, and
supplying the non-aqueous electrolyte obtained to the negative electrode.

6. The lithium secondary battery production method according to claim 5, using, as the non-aqueous electrolyte, a non-aqueous electrolyte comprising the cyclic siloxane at 0.01 to 20% by mass.

7. A vehicle comprising the lithium secondary battery according to claim 1.

* * * * *